United States Patent
Nishizawa et al.

(10) Patent No.: US 10,142,515 B2
(45) Date of Patent: Nov. 27, 2018

(54) IMAGE FORMING APPARATUS AND ABNORMALITY DETERMINATION METHOD

(71) Applicant: CANON KABUSHIKI KAISHA, Tokyo (JP)

(72) Inventors: Yuki Nishizawa, Yokohama (JP); Hiroyuki Yamazaki, Mishima (JP); Michio Sugano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/430,144

(22) Filed: Feb. 10, 2017

(65) Prior Publication Data

US 2017/0244862 A1    Aug. 24, 2017

(30) Foreign Application Priority Data

Feb. 18, 2016    (JP) .................................. 2016-028793

(51) Int. Cl.
- *G03G 15/00* (2006.01)
- *H04N 1/407* (2006.01)
- *H04N 1/00* (2006.01)
- *H04N 1/56* (2006.01)
- *H04N 1/60* (2006.01)

(52) U.S. Cl.
CPC ....... *H04N 1/4072* (2013.01); *H04N 1/00572* (2013.01); *H04N 1/00811* (2013.01); *H04N 1/00909* (2013.01); *H04N 1/56* (2013.01); *H04N 1/6036* (2013.01); *H04N 2201/0094* (2013.01)

(58) Field of Classification Search
CPC ........... H04N 1/00572; H04N 1/00811; H04N 1/00909; H04N 1/4072; H04N 1/56; H04N 2201/0094

See application file for complete search history.

(56) References Cited

U.S. PATENT DOCUMENTS

| | | | | |
|---|---|---|---|---|
| 9,906,689 | B2 * | 2/2018 | Sakatani | H04N 1/6033 |
| 2012/0092731 | A1 * | 4/2012 | Nishida | H04N 1/00602 |
| | | | | 358/474 |
| 2013/0293909 | A1 * | 11/2013 | Endo | H04N 1/00596 |
| | | | | 358/1.12 |

(Continued)

FOREIGN PATENT DOCUMENTS

| | | | |
|---|---|---|---|
| JP | 3309306 | B2 * | 7/2002 |
| JP | 2004-133081 | A | 4/2004 |
| JP | 2010-034678 | A | 2/2010 |

(Continued)

OTHER PUBLICATIONS

"Introduction to MT System", pp. 65-68, pp. 109-116.

*Primary Examiner* — Francis C Gray

(74) *Attorney, Agent, or Firm* — Canon USA Inc., IP Division

(57) ABSTRACT

An image forming apparatus includes an input unit configured to input image data, an image forming unit configured to form an image on a recording material based on the input image data, a reading unit configured to read the image formed on the recording material, and a control unit configured to, based on the input image data and the image read by the reading unit, acquire a plurality of change amounts from the read image, and determine a type of an abnormal image based on a plurality of the acquired change amounts.

16 Claims, 13 Drawing Sheets

(56) References Cited

U.S. PATENT DOCUMENTS

2014/0327921 A1\* 11/2014 Ogata ................ H04N 1/00572
 358/1.12
2015/0243010 A1\* 8/2015 Kaneko .................. G06T 7/001
 382/112

FOREIGN PATENT DOCUMENTS

| JP | 2013-122560 A | 6/2013 |
| JP | 2014-16437 A | 1/2014 |
| JP | 2014-136353 A | 7/2014 |

\* cited by examiner

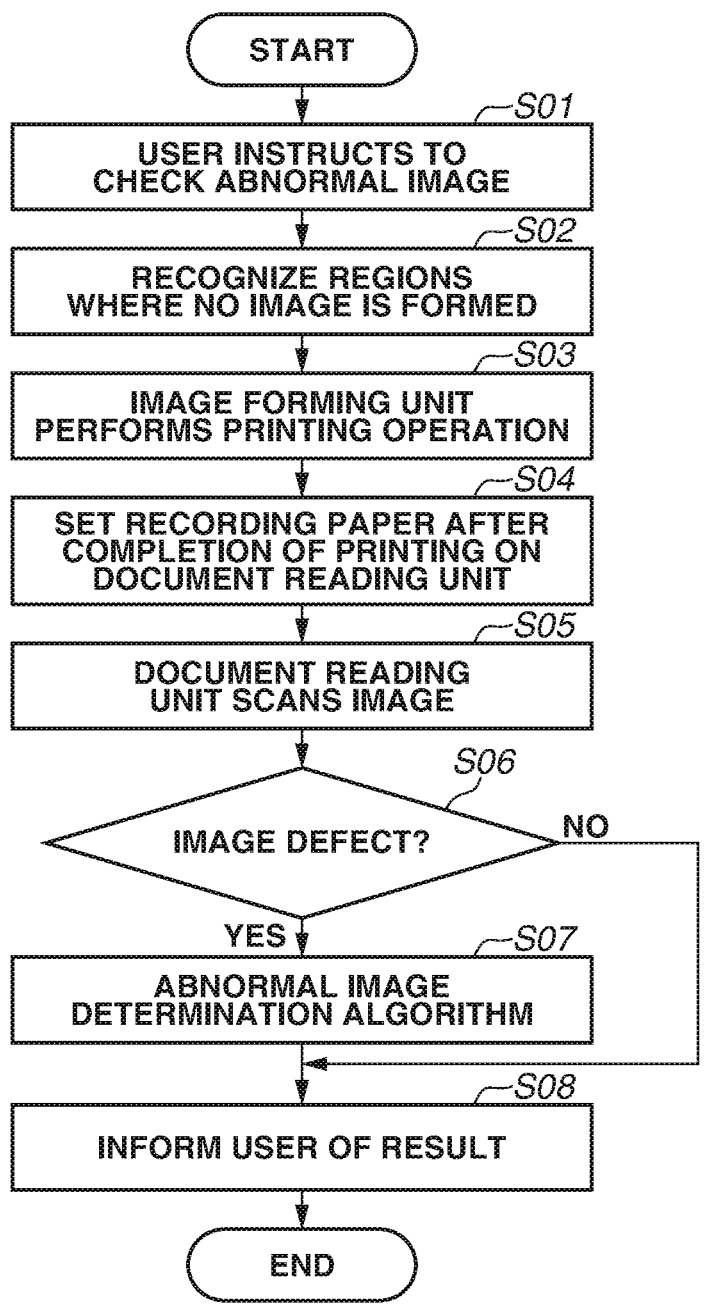

IMAGE DATA

PRINTED IMAGE

BLACK DOT

LONGITUDINAL
STRIPES

LATERAL
STRIPES

IMAGE DATA

PRINTED IMAGE

IMAGE FORMING APPARATUS AND ABNORMALITY DETERMINATION METHOD

BACKGROUND OF THE INVENTION

Field of the Invention

The present invention relates to an apparatus for analyzing an image formed by an image forming apparatus to determine an abnormality, and also to an abnormality determination method.

Description of the Related Art

Printers, copying machines, and facsimiles are known as image forming apparatuses for forming an image on a recording material such as paper. For example, in a case of an electrophotographic image forming apparatus, a service engineer performs maintenance services to maintain the image quality of an image formed on paper. Photosensitive members and an intermediate transfer belt are examples of parts which are consumed accompanying the operations of an image forming apparatus. Such consumables are replaced with new ones by the service engineer as maintenance services. Factors for causing consumption of component parts generally include: friction and wear accompanying image forming operations, mixing of paper powder into a toner image, increased adhesive force due to excessive stirring of toner and detachment of external additives, and contamination and degradation of cleaning and charging members caused by toner and paper powder. These factors may degrade the image quality of an image formed on paper. Examples of abnormal images with degraded image quality include:

(1) An abnormal image having lateral stripes perpendicular to the rotational direction of the photosensitive member and intermediate transfer belt (also referred to as an image of laterally uneven density)

(2) An abnormal image in form of spots (also referred to as a black-dot image)

(3) An abnormal image having longitudinal stripes along the rotational direction of the photosensitive member or an intermediate transfer belt (also referred to as an image of longitudinally uneven density)

When any such abnormal images is formed on a recording material, a user notices the abnormal image and replaces the component parts such as the photosensitive drum and the intermediate transfer belt. If the user addresses a problem only after he visually notices an abnormal image, time will be consumed from occurrence of the abnormality until completion of addressing the problem. In addition, the recording material on which the abnormal image is formed will go to waste. Since image formation needs to be carried out again, toner will be wastefully consumed.

Japanese Patent Application Laid-Open No. 2004-discusses an apparatus which forms and outputs a sample image different from a usual image on a recording material, reads the sample image formed on the recording material by using a reading scanner (image input unit), and, based on the read image, finds an early sign of the abnormal image at the time of image formation. This enables finding the sign of the abnormality before the abnormality occurs at the time of normal image formation, and a necessary measure can be taken at an early stage. Japanese Patent Application Laid-Open No. 2014-16437 discusses a technique for detecting feature quantities of an abnormal image from the image read by the reading scanner (image input unit) and determining the time-sequential characteristics regarding the feature quantities of the abnormal image at a plurality of timings. Thus, a defective portion causing the abnormal image can be determined and information about failure is notified.

Such conventional techniques enable predicting the occurrence of an abnormality in advance or identifying a defective portion. Thus, the downtime of the image forming apparatus can be reduced by preparing and using replacement parts.

Further improvement in the accuracy is now demanded with respect to the system for detecting the sign of the abnormality discussed in Japanese Patent Application Laid-Open No. 2004-133081 and the system for determining a defective portion discussed in Japanese Patent Application Laid-Open No. 2014-16437. Since there are a number of types of abnormal images, it is necessary to choose feature quantities suitable for the type of each abnormal image. Although feature quantities can be time-sequentially determined as discussed in Japanese Patent Application Laid-Open No. 2014-16437 to a certain extent, the accuracy and reliability are limited in this method. If the type of image abnormality is incorrectly determined, for example, the method may prompt the user to replace the parts which are still fully usable. On the other hand, the method may also prompt the user to replace the parts in a delayed fashion. If the replacement of the parts is delayed, the apparatus may become unusable.

SUMMARY OF THE INVENTION

The present invention is directed to improvement of the accuracy and reliability in determining an abnormal image.

According to an aspect of the present invention, an image forming apparatus includes an input unit configured to input image data, an image forming unit configured to form an image on a recording material based on the image data input by the input unit, a reading unit configured to read the image formed on the recording material by the image forming unit, and a control unit configured to, based on the input image data and the image read by the reading unit, acquire a plurality of change amounts from the read image, and determine a type of an abnormal image based on a plurality of the acquired change amounts.

According to another aspect of the present invention, an image forming apparatus includes an input unit configured to input image data, an image forming unit configured to form an image on a recording material based on the image data input by the input unit, a reading unit configured to read the image formed on the recording material by the image forming unit, and a control unit configured to, based on the input image data and the image read by the reading unit, acquire feature quantities in a partial range of the read image, acquire data corresponding to a rank based on the acquired feature quantities, and determine a rank of an abnormal image based on the acquired data.

According to an aspect of the present invention, a method for determining an abnormality of an image formed on a recording material by an image forming apparatus includes acquiring a plurality of change amounts from a read image based on input image data and the image read by a reading unit and determining a type of an abnormal image based on a plurality of the acquired change amounts.

According to another aspect of the present invention, a method for determining an abnormality of an image formed on a recording material by an image forming apparatus includes acquiring feature quantities in a partial range of a read image based on input image data and the image read by a reading unit and acquiring data corresponding to a rank based on the acquired feature quantities, and determining a rank of an abnormal image based on the acquired data.

Further features of the present invention will become apparent from the following description of exemplary embodiments with reference to the attached drawings.

BRIEF DESCRIPTION OF THE DRAWINGS

FIG. 3 is a flowchart illustrating an image defect reading process according to the first exemplary embodiment.

DESCRIPTION OF THE EMBODIMENTS

Exemplary embodiments of the present invention will be described below with reference to the accompanying drawings. The present invention relates to an image forming apparatus capable of determining an abnormal image and an abnormality determination method.

A first exemplary embodiment will be described below.
(1) Overview of Overall Configuration of Image Forming Apparatus (Image Forming System)

Figure 1:
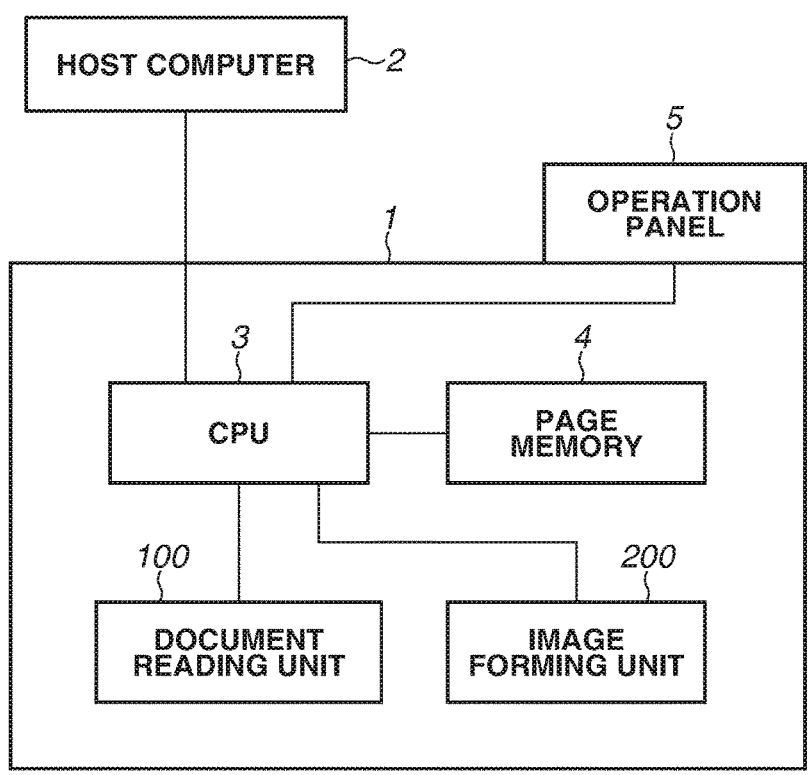
FIG. 1 is a block diagram illustrating a copying machine according a first exemplary embodiment.

FIG. 1 is a block diagram illustrating an image forming system according to the first exemplary embodiment. The image forming system (described below) is a system (apparatus) including a reading unit and a laser beam printer. In a case where a host computer 2 (hereinafter referred to as a computer 2 connected as an external apparatus instructs the image forming apparatus 1 to perform printing, the computer 2 rasterizes image data into a bitmap image and transmits it to the image forming apparatus 1. The image forming apparatus 1 processes the image data input from the computer 2 via a central processing unit (CPU) 3 and stores the processed data in a memory 4. The CPU 3 reads the image data stored in the memory 4, forms an image on paper through an operation of an image forming unit 200, and outputs the formed image. In the case of reading a document to be copied instead of image data from the computer 2, a user sets the document onto a document reading unit 100 and instructs the CPU 3 to perform a copy operation from an operation panel 5. The document reading unit 100 reads an image of the document and transfers the read image to the CPU 3. Then the CPU 3 rasterizes the image into a bitmap image and stores the bitmap image in the memory 4 as image data. The CPU 3 reads the image data stored in the memory 4, forms an image on paper through operations of the image forming unit 200, and outputs the paper (also referred to as a copy operation).

Figure 2:
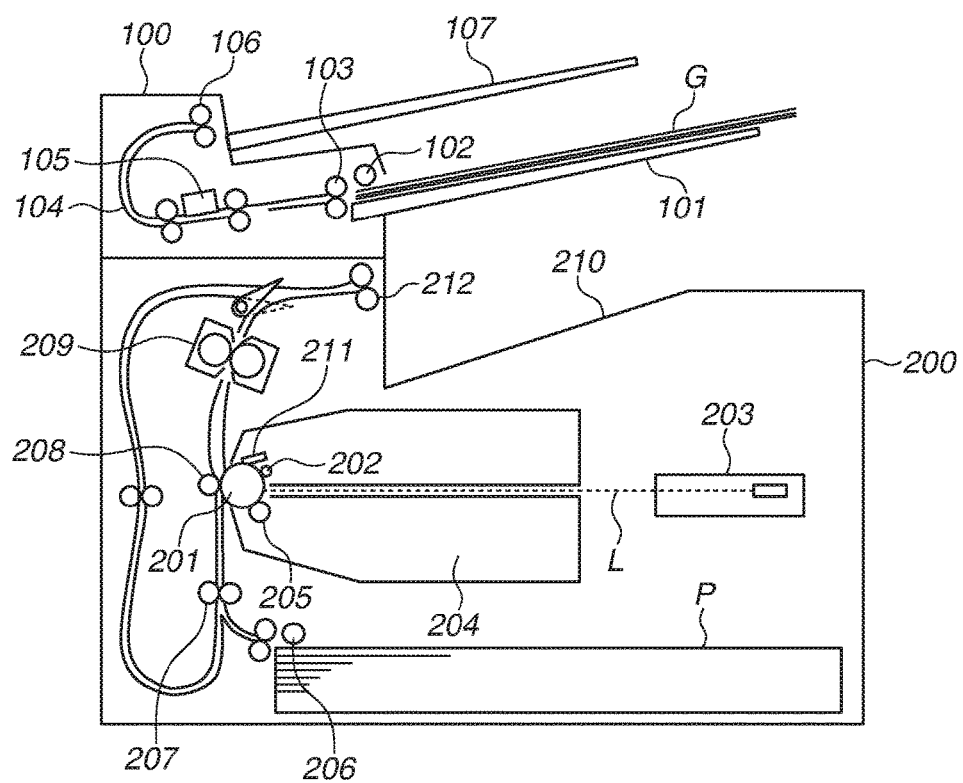
FIG. 2 illustrates a document reading unit and an image forming unit in detail.

FIG. 2 illustrates in detail the document reading unit 100 and the image forming unit 200. The document reading unit 100 and the image forming unit 200 will be respectively described below with reference to FIG. 2.
(2) Reading Unit The reading unit 100 functions as an apparatus for reading and inputting an image of a document G. The reading unit 100 is provided at the upper portion of the image forming unit 200 (described below). The reading unit 100 includes a paper feed unit 101 on which the document G is set, a pickup roller 102 for sending out sheets of the document G one by one, and a feeding and the separation roller pair 103. A document conveyance path 104 is provided with a reading unit 105 for reading the upper surface of the document G. The reading unit 105 includes a contact image sensor (CIS). The reading unit 105 reads image data and sends the read image to the CPU 3. The reading unit 100 further includes a discharge unit 107 to stack sheets of the document G discharged by a document discharge roller 106. The image sent to the CPU 3 is captured by the CPU 3 as red, green, and black (RGB) encoded information, for example, on a 24 bits per pixel (bpp) basis. More specifically, the captured image data is represented by three 8-bit unsigned integers (from 0 to 255) which respectively indicate luminance of red, green, and blue (r value, g value, and b value). Examples of (r value, g value, b value) include (0, 0, 0) for a black pixel, (255, 0, 0) for a red pixel, (0, 255, 0) for a green pixel, and (0, 0, 255) for a blue pixel.
(3) Image Forming Unit The image forming unit 200 is an electrophotographic laser beam printer. A photosensitive drum 201 is an image bearing member which is rotatably driven at a predetermined peripheral speed. The surface of the photosensitive drum 201 is charged to have a predetermined polarity and at a predetermined potential by a charging roller 202. A laser beam scanner 203 as an exposure unit outputs laser light L modulated according to the image data transmitted from the CPU 3. When the laser beam scanner 203 scans the surface of the photosensitive drum 201 with the laser light L, the surface is exposed to light. An electrostatic latent image is formed on the photosensitive drum 201 by the scanning and exposure processes. In a developing apparatus 204, toner is supplied from a developing roller 205 to the surface of the photosensitive drum 201, and an electrostatic latent image is subjected to development to become a toner image. A feed roller 206 is driven based on a paper feeding start signal generated at predetermined timing, and the recording materials P are picked up, separated, and fed one by one. Each recording material P passes through a registration roller 207 and is conveyed at predetermined timing to an image transfer nip portion formed by the photosensitive drum 201 and a transfer roller 208. When a transfer voltage having the opposite polarity to the toner's polarity is applied to the transfer roller 208, the transfer roller 208 transfers the toner image formed on the surface of the photosensitive drum 201 onto the surface of the recording material P. Then, the toner image is fixed on the recording material P by the fixing apparatus 209 and then is discharged onto a discharge tray 210. Meanwhile, toner remaining on the surface of the photosensitive drum 201 is cleaned by a cleaning apparatus (cleaning blade) 211 of contact type.

(4) Descriptions of Typical Abnormal Images

Three different typical abnormal images which may originate in an electrophotographic image forming apparatus will be described below.

1) Image with Laterally Uneven Density

If there is an uneven resistance (also referred to as uneven charging) in the circumferential direction (also referred to as the rotational direction) of the charging roller 202, the surface potential of the photosensitive drum 201 fluctuates. The fluctuation of the surface potential causes loading of an uneven amount of toner when the developing roller 205 supplies toner, so that an uneven image density is generated in the direction perpendicularly intersecting with the circumferential direction, resulting in an image having lateral stripes. This phenomenon becomes conspicuous when the resistance of a surface coating layer rises or when foreign substances adhere and accumulate on the charging roller 202 after continuously using the charging roller 202.

2) Black-Dot Image

If adhering foreign substances (such as paper powder) accumulate on the surface of the charging roller 202, the charging potential at that portion cannot be properly formed on the surface of the photosensitive drum 201. As a result, a black-dot image defect may arise.

3) Image with Longitudinally Uneven Density

To bring the cleaning blade 211 into stable contact with the photosensitive drum 201, it is necessary to ensure that the photosensitive drum 201 is sufficiently lubricated by supplying a lubricant such as toner and Tospearl to the contact portion. If printing is continued in a state where no lubricant is borne on the portion of the photosensitive drum 201, the contact state gradually becomes unstable, and toner remaining on the photosensitive drum 201 cannot be sufficiently cleaned (scratched) and part of toner passes through the cleaning blade 211. If the toner passes through in this way, longitudinal stripes appear in the image.

The possibility that each of the above-described three different abnormal images is generated increases with increase in the use of the relevant members. If image formation continues, the abnormal condition of the abnormal image gradually becomes conspicuous and the abnormal image appears more frequently.

(5) Descriptions of Abnormal Image Reading and Determination Operations

Figure 4A:
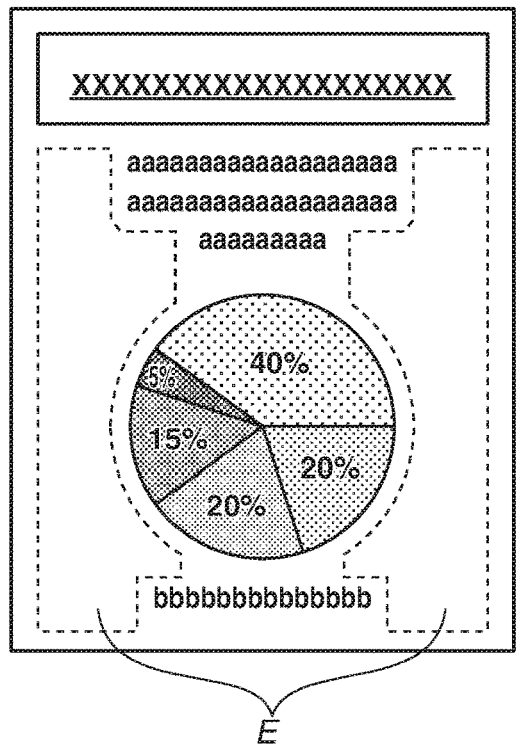
FIGS. 4A and 4B illustrate image data and a printed image.

The following describes a flow of operations for reading an abnormal image and determining an abnormality of the read image. An abnormal image reading process proceeds according to the flowchart illustrated in FIG. 3. In step S01, the user instructs the CPU 3 to read the abnormal image and determine the abnormality from the operation panel 5 (FIG. 1). In step S02, in response to the instruction from the user, the CPU 3 recognizes regions E having no image data (regions where no image is formed on the recording material P) out of the image data stored in the memory 4, as illustrated in FIG. 4A. A region having no image data means a region where no image is formed based on the image data out of image forming regions where image formation is possible. In this case, the image used for diagnosis may be, for example, an arbitrary image with respect to which the user has instructed the CPU 3 to perform printing in another case. A dedicated test chart does not need to be used. In step S03, the CPU 3 performs a printing operation through the image forming unit 200 based on the image data stored in the memory in step S02. In step S04, the user sets onto the reading unit 100 the recording material P for which a printing operation is completed and then instructs the CPU 3 to read the recording material P. In step S05, the reading unit 100 scans the image formed on the fed recording material P. The CPU 3 converts the RGB signal of the read image (a color image in this example) into a monochrome image signal. The lightness value Y is calculated based on the RGB values, for example, by using the following formula (1).

$$Y=0.3R+0.59G+0.11B \quad \text{(Formula 1)}$$

Figure 4B:
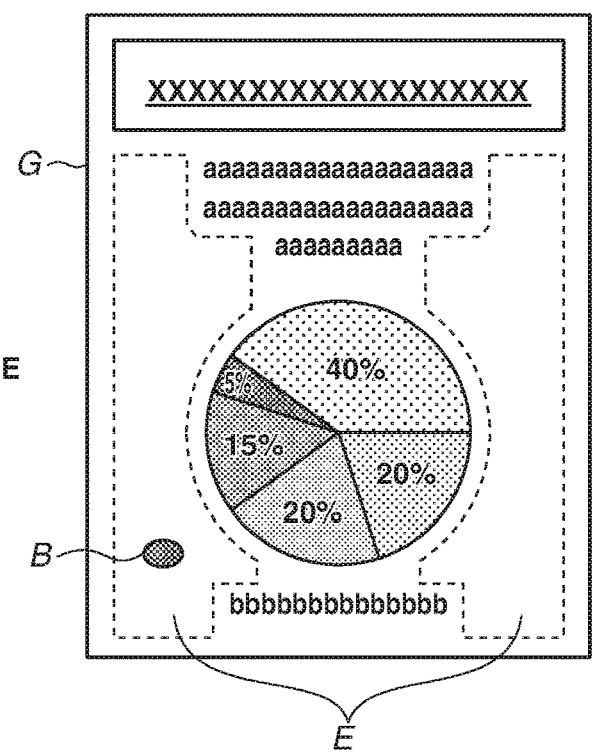

The multipliers 0.3, 0.59, and 0.11 for the RGB values are coefficients (fixed values) predetermined to obtain the lightness value Y. In step S06, the CPU 3 determines whether there is an image defect. When the lightness values is equal to or smaller than a threshold lightness value for all the pixels, the CPU 3 determines that there is no image defect (NO in step S06). On the other hand, if an image is formed in a region E where no image is formed, as illustrated in FIG. 4B, the lightness values of pixels in a region exceed the threshold lightness value. Therefore, the CPU 3 determines that there is an image defect (YES in step S06), and the processing proceeds to step S07. In step S07, the processing proceeds to a process for performing "abnormal image determination (determination algorithm)" to be described in detail below. Then, via the operation panel 5 or the computer 2, the CPU notifies the user of the determination result, for example, a message prompting the user to request repair or adjustment such as parts replacement. Alternatively, if the image forming apparatus 1 is connected to a network, the CPU 3 may notify a service center (not illustrated) of the determination result via the network.

(6) Abnormal Image Determination Processing

Figure 5A:
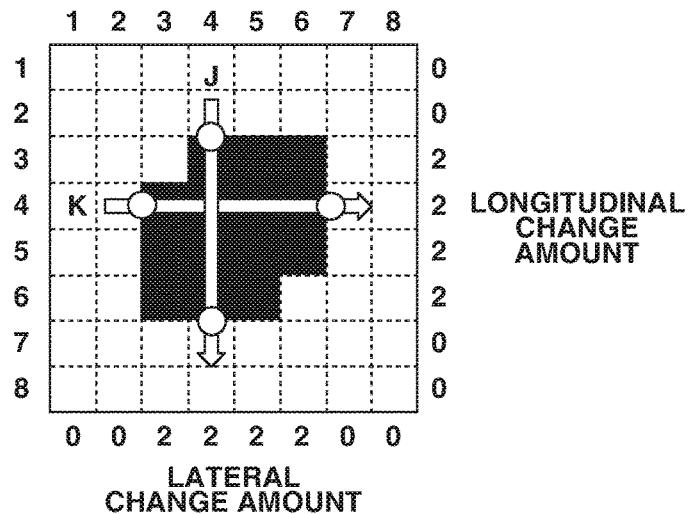
FIGS. 5A, 5B, and 5C illustrate a method for extracting feature quantities in the case of image defects.
Figure 5B:
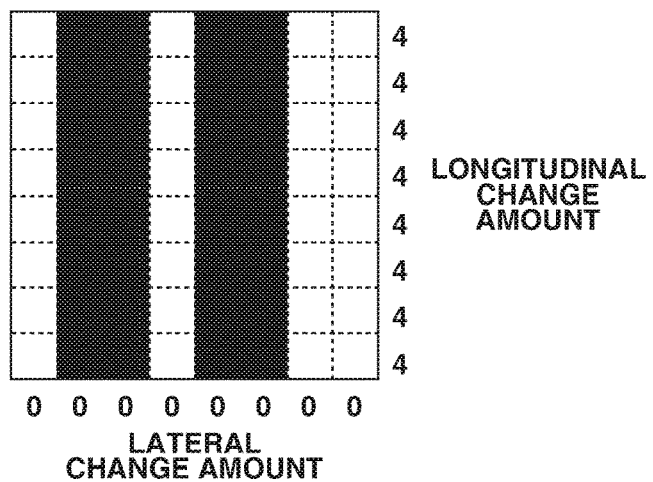
Figure 5C:
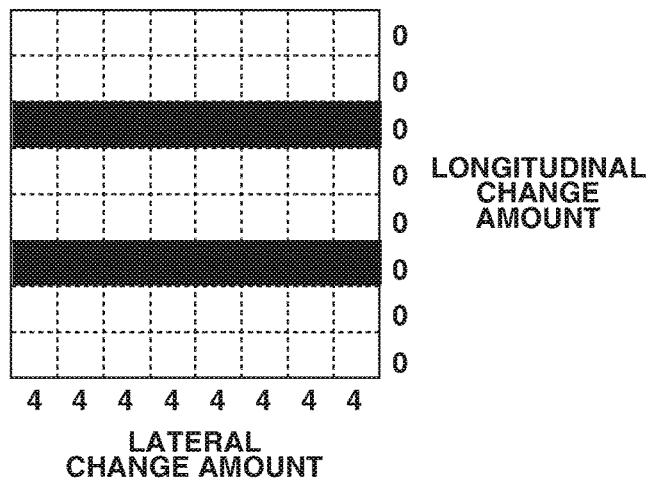

The abnormal image determination processing in step S07 illustrated in FIG. 3 will be described in detail below. FIG. 5A illustrates a "black-dot image" as an example of an abnormal image. The CPU 3 calculates the lightness value of each pixel in an 8×8 pixel region, and determines whether the lightness value is equal to or larger than a threshold value for each pixel. The CPU 3 displays a pixel in black when the lightness value is equal to or larger than the threshold value, and displays a pixel in white when the lightness value is smaller than the threshold value. Similarly, FIG. 5B illustrates an image with longitudinally uneven density. FIG. 5C illustrates an image with laterally uneven density. The uneven density images illustrated in FIGS. 5B and 5C are images having the most remarkable density unevenness, i.e., images having white stripes.

The first exemplary embodiment provides the method for extracting feature quantities of an abnormal image. More specifically, the method obtains the change amount by counting the number of portions where the pixel changes from white to black or vice versa. For example, if a focus falls on the fourth row illustrated in FIG. 5A, when the number of portions where the pixel changes from white to black or vice versa is counted on the arrow K, there are two changed portions (marked O). The CPU 3 performs similar coefficient processing on all the eight rows and recognizes the resultant values as "longitudinal change amounts". The CPU 3 performs similar coefficient processing on all the eight columns and recognizes the resultant values as "lateral change amounts". Thus, the CPU 3 obtains a total of 16 numerical values in the longitudinal and lateral directions. The CPU 3 further obtains numerical values in a similar way for the abnormal images illustrated in FIGS. 5B and 5C. Table 1 summarizes numerical values of the longitudinal and lateral change amounts.

TABLE 1

| | Black-dot image | Image with longitudinally uneven density | Image with laterally uneven density |
|---|---|---|---|
| Longitudinal change amount | 0 | 4 | 0 |
| | 0 | 4 | 0 |
| | 2 | 4 | 0 |
| | 2 | 4 | 0 |
| | 2 | 4 | 0 |
| | 2 | 4 | 0 |
| | 0 | 4 | 0 |
| | 0 | 4 | 0 |
| Total of longitudinal change amounts | 8 | 32 | 0 |
| Lateral change amount | 0 | 0 | 4 |
| | 0 | 0 | 4 |
| | 2 | 0 | 4 |
| | 2 | 0 | 4 |
| | 2 | 0 | 4 |
| | 2 | 0 | 4 |
| | 0 | 0 | 4 |
| | 0 | 0 | 4 |
| Total of lateral change amounts | 8 | 0 | 32 |

Table 2 puts together "total of longitudinal change amounts" and "total of lateral change amounts" which are used to determine the type of an image defect.

TABLE 2

| | Black-dot image | Image with longitudinally uneven density | Image with laterally uneven density |
|---|---|---|---|
| Total of longitudinal change amounts | 8 | 32 | 0 |
| Total of lateral change amounts | 8 | 0 | 32 |

Based on this result, the following numerical determination is possible.

1) Total of longitudinal change amounts=Total of lateral change amounts: Black-dot image
2) Total of longitudinal change amounts>Total of lateral change amounts: Image with longitudinally uneven density
3) Total of longitudinal change amounts<Total of lateral change amounts: Image with laterally uneven density When the determined result is "black-dot image" or "image with laterally uneven density", the CPU 3 displays information indicating that an abnormality has occurred on the charging roller 202 via the operation panel 5 or the computer 2. When the determined result is "image with longitudinally uneven density", the CPU 3 displays information indicating that an abnormality has occurred on the cleaning blade 211 via the operation panel 5 or the computer 2. This display notifies the user or service engineer of the abnormality.

The above-described relations 1) to 3) may be determined by setting marginal values to the change amount range. Specific marginal values in this case may be set according to the obtained data based on a plurality of abnormal image samples.

The method for determining the type of image abnormality according to the first exemplary embodiment has been described. The present exemplary embodiment relates to the following points:

(1) Including a determination algorithm for obtaining the longitudinal and lateral change amounts and determining the type of image abnormality based on the relation between the obtained change amounts.

(2) Requiring no dedicated test pattern since regions where no image is formed (also referred to as white portions) are read. Since no recording material is used for checking an abnormal image, recording materials can be saved.

Figure 6A:
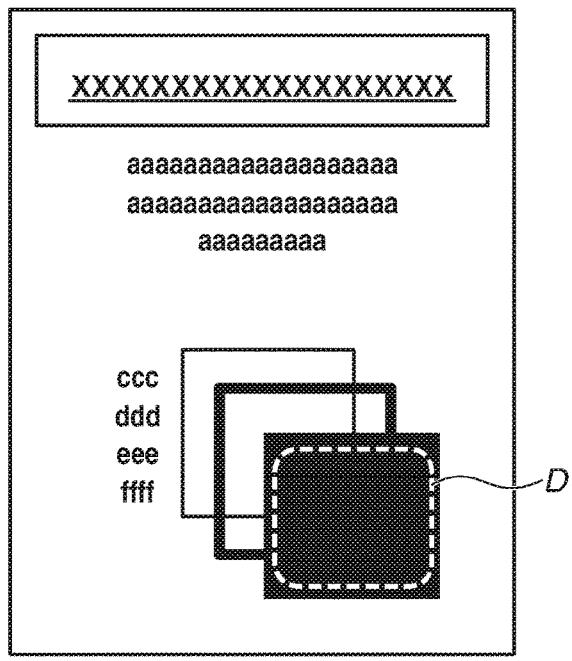
FIGS. 6A and 6B illustrate image data and a printed image.
Figure 6B:
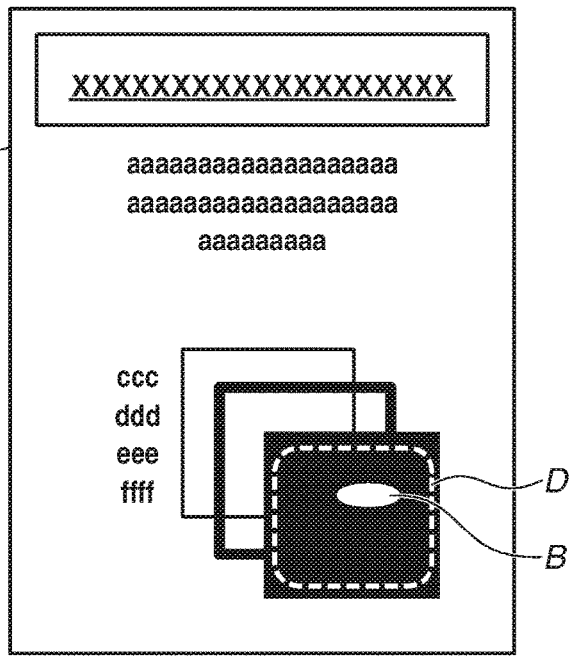

Although, in the present exemplary embodiment, an abnormal image is determined by reading regions where no image is formed, this determination can also be made, for example, by extracting part of an image region having a uniform density or part of a half-tone portion. For example, the region in a solid portion D having a uniform density is read from the image data illustrated in FIG. 6A, and an abnormal image B (white portion) where a toner image is missing in the printed image illustrated in FIG. 6B can be determined.

A second exemplary embodiment will be described below. The second exemplary embodiment relates to determining an abnormal image in a color image forming apparatus including a plurality of image forming units which is capable of forming a full color image. In particular, the second exemplary embodiment provides a method for determining the color of an image. Other elements such as the abnormal image reading process are similar to those in the first exemplary embodiment, and redundant descriptions thereof will be omitted.

(1) Image Forming Unit

Figure 7:
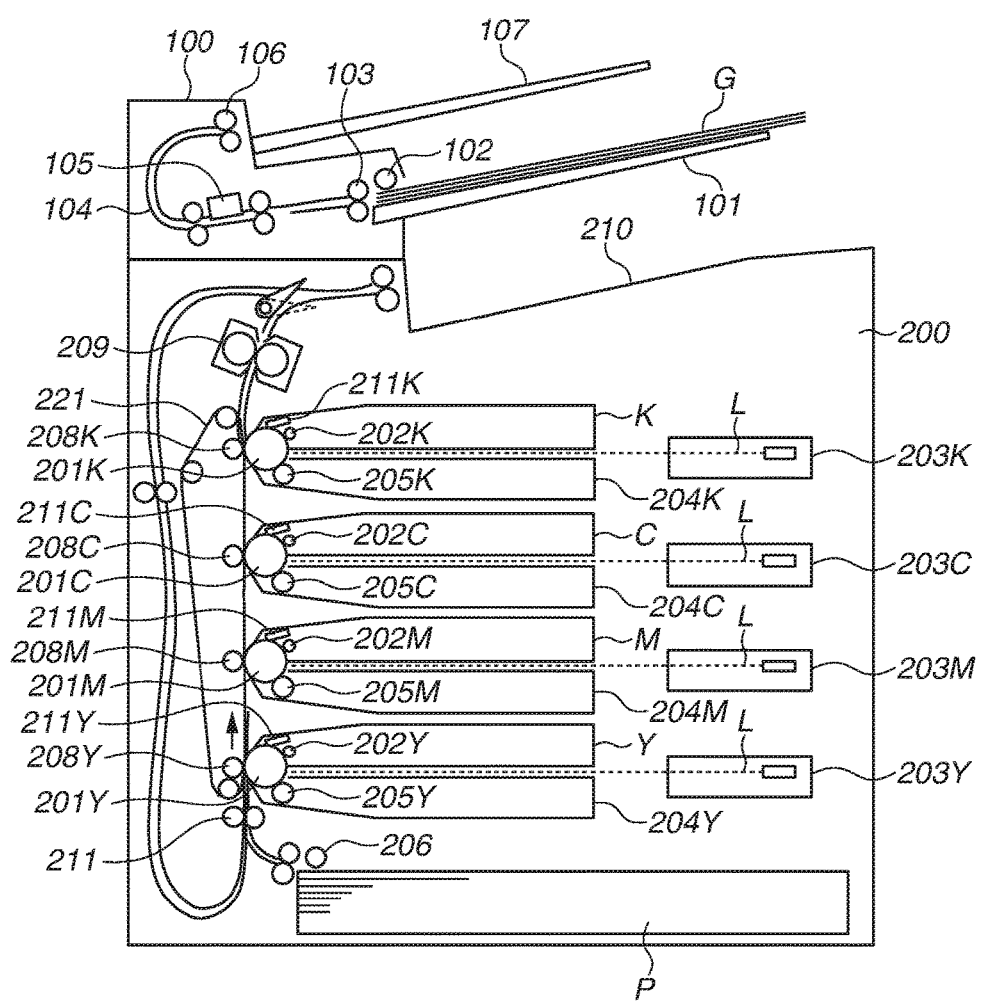
FIG. 7 schematically illustrates a configuration of a copying machine according to a second exemplary embodiment.

FIG. 7 schematically illustrates a configuration of an image forming apparatus according to the second exemplary embodiment. The image forming apparatus according to the present exemplary embodiment differs from the image forming apparatus according to the first exemplary embodiment in that the recording material P is conveyed by an electrostatic adsorptive transfer belt 221 and that a plurality of image forming units for forming a multi-color image on the recording material P is provided. A process cartridge Y for yellow, a process cartridge M for magenta, a process cartridge C for cyan, and a process cartridge K for black are vertically disposed as image forming units for different colors. Each process cartridge repeats an operation similar to the first exemplary embodiment in the moving direction of the electrostatic adsorptive transfer belt 221. Toner images formed in respective colors are adsorbed on the electrostatic adsorptive transfer belt 221 and superimposed on the conveyed recording paper P to form a full color image. If an abnormal image is generated in this configuration, since the colors of adhering toner are different, it is important to identify a process cartridge in which the abnormal image has been generated. The defect image determination algorithm according to the present exemplary embodiment is characterized in chromaticity analysis.

(2) Color Determination Algorithm

Color information of the abnormal image is captured by the CPU 3 as RGB information encoded on a 24 bits per pixel (bpp) basis. The captured image data can be represented by three 8-bit unsigned integers (from 0 to 255) which respectively indicate luminances of red, green, and blue (r value, g value, and b value). Examples of the values include (0, 0, 0) for black, (255, 255, 0) for yellow, (255, 0, 255) for magenta, and (0, 255, 255) for cyan. For example, if an abnormal image is generated in the cyan process cartridge, the color of the corresponding image forming unit (cyan) is the most common, and (r value, g value, b value) forms a distribution centering on the above-described value of cyan (0, 255, 255). Therefore, to determine the image forming unit in which an abnormal image is newly generated, it is necessary to prepare determination threshold values for (r value, g value, b value), respectively. In order to determine a threshold value, the algorithm analyzes a sample of an abnormal image acquired in advance for the cyan cartridge in order to obtain the average value m of (r value, g value, b value). Then, Pi is taken for each of (r value, g value, b value) of the new abnormal image to obtain the standard deviation σ for each value. The standard deviation σ is a square root of the variance $\sigma2=\Sigma\{(Pi-m)2/N\}$, where N is the number of populations.

The algorithm multiplies the acquired standard deviation σ by a predetermined constant k, and adds the average value m to the product to obtain the threshold value. More specifically, the algorithm calculates the threshold value $T=m+k\times\sigma$ for each value, where the constant k specifies a confidence interval in a normal distribution. For example, if the constant k is 1.96, pixel data having pixel values of 95% or larger confidence interval indicates the cyan region. Further, if the constant k is 2.32, pixel data having pixel values of 98% or larger confidence interval indicates the cyan region. In the present exemplary embodiment, the constant k is set to 2.32. Thus, the cyan region can be determined for pixel values of 98% or larger confidence interval for each of (r value, g value, b value). The algorithm performs similar processing on yellow, magenta, and black to prepare a determination region for each color.

When this color determination algorithm is added to the abnormal image determination algorithm, it can be determined that the abnormal image has been generated in either of the process cartridges Y, M, C, and K, in addition to the type of image abnormality. This combination of the two algorithms makes it possible to determine the type of image abnormality and, in the case of a color image forming apparatus, identify the process cartridge in which the abnormal image has been generated. It is also possible to notify the user or service center of the result of the determination. Although, in the present exemplary embodiment, a threshold value is acquired based on the average value and standard deviation, the present invention is not limited thereto. The well-known Mahalanobis-Taguchi method ("Introduction to MT System", JUSE Press, Ltd., 2008) is also applicable.

A third exemplary embodiment will be described below. The third exemplary embodiment offers a method for determining the type of image abnormality and further determining the level of image abnormality. If the level of image abnormality can be determined, it becomes possible to more minutely deal with the abnormal image according to the determined level. It is difficult to determine the level of image abnormality based only on change of specific feature quantities, as described in the first exemplary embodiment. The present exemplary embodiment will be described below centering on a method for suitably determining the level of image abnormality.

Figure 8A:
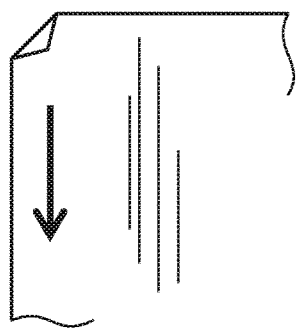
FIGS. 8A, 8B, 8C, and 8D illustrate images with faulty cleaning.
Figure 8B:
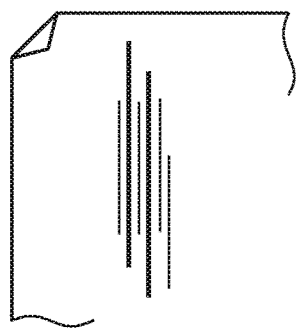
Figure 8C:
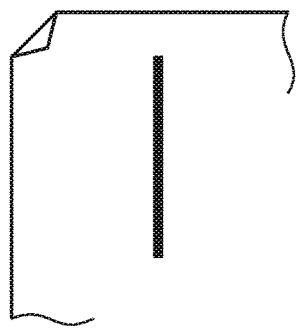
Figure 8D:
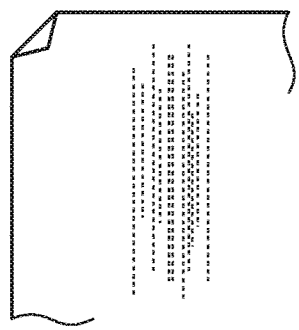

The present exemplary embodiment will be described below centering on a cleaning apparatus as a part. As described above, the cleaning apparatus 211 for cleaning toner in contact with the photosensitive drum 201 includes a cleaning member called a cleaning blade. By causing the tip of the cleaning blade 211 to stably contact the photosensitive drum 201, toner remaining on the surface of the photosensitive drum 201 can be collected. If this contact state becomes unstable, toner will pass through the tip of the cleaning blade 211. As a result, as illustrated in FIG. 8A, an abnormal image having thin longitudinal stripes is generated in the direction parallel with the recording material conveyance direction indicated by the arrow. If this abnormal image having longitudinal stripes is neglected, the tip of the cleaning blade 211 will be minutely chipped, which allows a larger amount of toner to pass through the tip of the cleaning blade 211. This condition will gradually increase the density of longitudinal stripes. The abnormal image due to faulty cleaning is a phenomenon which occurs in a very unstable way. In the initial stage, this type of the abnormal image phenomenon repeats its occurrence and non-occurrence at irregular intervals. Normally, as illustrated in FIG. 8B, the number of lines and the density gradually increase. However, if the tip of the cleaning blade 211 is locally and largely chipped, a thick stripe as illustrated in FIG. 8C may appear. In this state, distortions around the tip of the cleaning blade 211 can be resolved and therefore surrounding thin lines may disappear. In another case, the number of thin light stripes may increase, as illustrated in FIG. 8D. In this case, if a focus falls on a certain feature quantity (any one of the number of lines, density of lines, and thickness of lines), the feature quantity does not tend to monotonically increase while a level of image abnormality is changing. Further, a human being unconsciously determines the level of image abnormality based on various feature quantities such as maximum density, derivative value of density change, thickness of lines, the number of light lines, and the number of dense lines in a comprehensive and ambiguous way. In addition, determination results vary. Therefore, it is very difficult to make a relational formula between these feature quantities and the level of image abnormality.

(1) Algorithm for Determining Level of Image Abnormality

Accordingly, a determination algorithm is required for two different cases: 1) a case where it is necessary to comprehensively determine the level of image abnormality based on a number of feature quantities, and 2) a case where the relation between each feature quantity and the level of image abnormality is obscure and varies. As an algorithm for enabling such a determination, for example, the Mahalanobis-Taguchi method (hereinafter referred to as the MT method) discussed in "Introduction to MT System", JUSE Press Ltd.) is useful. With the MT method, a set of normal data used as a reference is predetermined (this data set is referred to as a unit space). Based on the distribution state of multi-dimensional information, the MT method calculates a Mahalanobis distance (hereinafter abbreviated to MD) of evaluation target data for this normal data set (population) and determines whether the calculated statistical distance falls within a certain threshold value to determine whether the evaluation target data is normal or abnormal.

The third exemplary embodiment is characterized in that, in the MT method, unit spaces are categorized as ranks A, B, and C which are levels of an identical abnormal image (hereinafter referred to as rank samples). The MT method calculates MD of the evaluation target data and determines a unit space to which the calculated MD is close, to determine the level of image abnormality due to faulty cleaning as the evaluation target data. Thus, rank determination is possible even in the above-described two cases, that is, 1) a case where it is necessary to comprehensively determine the level of image abnormality based on the number of feature quantities, and 2) a case where the relation between each feature quantity and the level of image abnormality is obscure and varies.

(2) Extraction of Feature Quantities

Figure 9A:
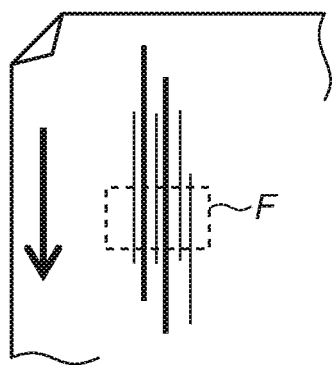
FIGS. 9A and 9B illustrate a method for extracting feature quantities in the case of the faulty cleaning.
Figure 9B:
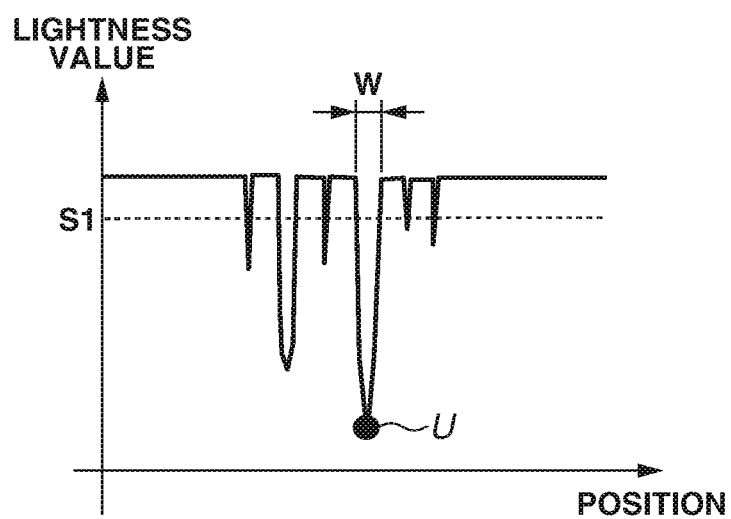

The algorithm extracts part of an image subjected to faulty cleaning as a region F enclosed by dashed lines illustrated in FIG. 9A. In the present exemplary embodiment, the algorithm extracts an image by using a 5×10 mm rectangular region as the region F (5 mm in the recording material conveyance direction and 10 mm in the direction perpendicular to the conveyance direction). The algorithm makes color determination by a method similar to the second exemplary embodiment, converts the RGB information into the lightness value based on a method similar to the first exemplary embodiment, and averages the components in the conveyance direction indicated by the arrow to acquire one-dimensional data as illustrated in FIG. 9B. The algorithm extracts the minimum lightness value U, the number of lines exceeding a threshold value S1, and the maximum line width value W. Table 3 illustrates the extracted feature quantities.

TABLE 3

|  | Evaluation target |
|---|---|
| Minimum lightness value U | 42 |
| Number of lines exceeding S1 | 7 |
| Maximum line width value W | 5 |

(3) Unit Space

According to the present invention, unit spaces are categorized as cleaning faulty ranks A, B, and C which are rank samples of an identical abnormal image. This data is acquired in advance and stored in a memory (not illustrated) within the CPU 3 or written in an electrically erasable programmable read only memory (EEPROM) (not illustrated). Rank determination was performed through human subjective evaluation based on the following determination criteria: (Rank A) abnormality of very minor level which is not normally noticed, (Rank B) abnormality which may be noticed and is within a tolerance level, and (Rank C) abnormality exceeding the tolerance level.

In the present exemplary embodiment, 100 different images of rank A were prepared as image samples subjected to faulty cleaning during printing by an identical image forming apparatus, and were read by an identical reading scanner. From the result of the faulty cleaning of all samples, the algorithm extracts feature quantities by using the method described in (1). As a result, numerical values as shown in Table 4 were obtained.

TABLE 4

| Feature quantities extracted from image samples of rank A | | | | |
|---|---|---|---|---|
|  | A1 | A2 | A3 | ... | A100 |
| Minimum lightness value U | 50 | 60 | 70 | ... | 65 |
| Number of lines exceeding S1 | 2 | 1 | 2 | ... | 1 |
| Maximum line width value W | 1 | 2 | 1 | ... | 2 |

Results for ranks B and C obtained in a similar way are shown in Tables 5 and 6.

TABLE 5

| Feature quantities extracted from image samples of rank B | | | | |
|---|---|---|---|---|
|  | B1 | B2 | B3 | ... | B100 |
| Minimum lightness value U | 30 | 45 | 67 | ... | 40 |
| Number of lines exceeding S1 | 6 | 8 | 6 | ... | 7 |
| Maximum line width value W | 5 | 4 | 3 | ... | 5 |

TABLE 6

| Feature quantities extracted from image samples of rank C | | | | |
|---|---|---|---|---|
|  | C1 | C2 | C3 | ... | C100 |
| Minimum lightness value U | 14 | 16 | 20 | ... | 12 |
| Number of lines exceeding S1 | 12 | 14 | 12 | ... | 16 |
| Maximum line width value W | 6 | 10 | 10 | ... | 8 |

(3) Calculation of MD (Mahalanobis Distance)

Assuming that the data shown in Table 3 is evaluation target, the algorithm calculates MD (Mahalanobis distance) for three cases, that is, a case where a unit space is ranked as rank A (numerical values illustrated in Table 4), a case where a unit space is ranked as rank B (numerical values illustrated in Table 5), and a case where a unit space is ranked as rank C (numerical values illustrated in Table 6). For this calculation method, the known method discussed in "Introduction to MT System", JUSE Press Ltd. was used. Calculation results are shown in Table 7.

TABLE 7

| Mahalanobis distance | |
|---|---|
| | Mahalanobis distance |
| Rank A | 10 |
| Rank B | 2 |
| Rank C | 15 |

Since the Mahalanobis distance for rank B is the shortest according to calculation results, the algorithm determines that the present evaluation target is rank B. With this algorithm, by obtaining a number of populations, diverse rank determination criteria can be applied, which achieves the determination close to human sensory evaluation. More specifically, the following three indices are used: 1) Degree of discomfort is high because of thin (sharp) lines, 2) Degree of discomfort is high because of a light density and a wide area, and 3) Degree of discomfort is high because of a large number of lines. The image quality rank can be determined in consideration of various cases, by including the above-described three indices in a unit space. Therefore, even if a status of abnormal image suddenly changes, the image quality rank can be correctly determined without making incorrect determination.

After the rank determination, the processing proceeds to step S08, similar to the first exemplary embodiment. In step S08, via the operation panel 5 or the host computer 2, the CPU 3 notifies the user of the determination result and, depending on the case, prompts the user to request repair or adjustment. Alternatively, the CPU 3 may notify a service center of the determination result via a network.

A fourth exemplary embodiment will be described below.

The image forming apparatuses according to the first to the third exemplary embodiments are provided with a conveyance path dedicated for the recording material P in the image forming unit and a conveyance path dedicated for the document G in the image reading unit. The fourth exemplary embodiment is characterized in that the conveyance path for the recording material P is also used as a conveyance path for the document G. This configuration enables abnormal image determination without bothering the user.

(1) Main Body Configuration

Figure 10:
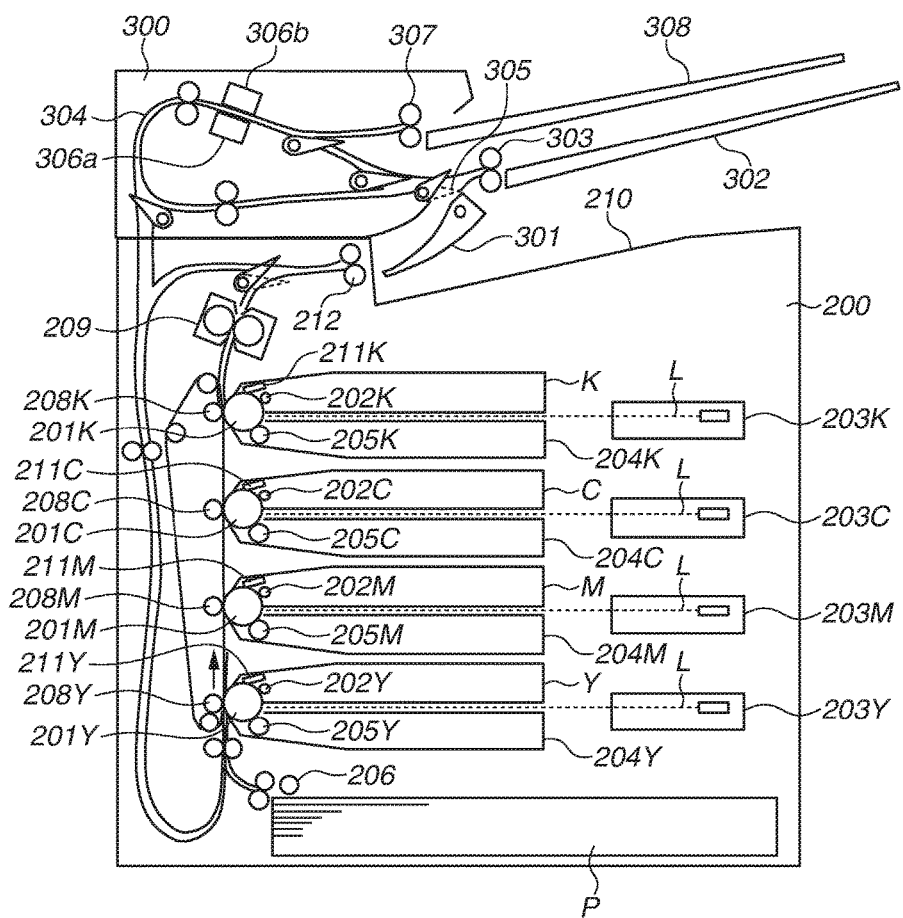
FIG. 10 schematically illustrates a configuration of a copying machine according to a fourth exemplary embodiment.

FIG. 10 illustrates the image forming apparatus according to the present exemplary embodiment which uses the conveyance path for the recording material P also as the conveyance path for the document G. A process for guiding the recording paper P to the document conveyance path 304 will be described below. A flapper 301 for guiding the recording material P is disposed on the downstream side of a discharge roller 212 and above the discharge tray 210. The flapper 301 functions as a conveyance path switching portion for switching between the direction for discharging the recording material P coming from the discharge roller 212 to the discharge tray 210 and the direction for sending the recording material P to a document discharge roller 303. The recording material P with an image formed thereon is guided by the flapper 301, passes a junction flapper 305, and is conveyed toward a paper feed unit 302 by the document discharge roller 303. Then, when the trailing end of the recording material P has passed the junction flapper 305, the CPU 3 switches the junction flapper 305 to the position drawn by dashed lines, and starts reverse rotation of the document discharge roller 303. When the recording material P is guided to reading units 306a and 306b, the reading units 306a and 306b read the image formed on the recording paper P. Then, the recording material P is sent to a document discharge roller 307 by a conveyance roller 36 and then is discharged and stacked on a discharge unit 308. The image forming apparatus is configured to read images formed on both sides of the recording material P by using the reading units 306a and 306b.

(2) Flowchart for Abnormal Image Determination

Figure 11:
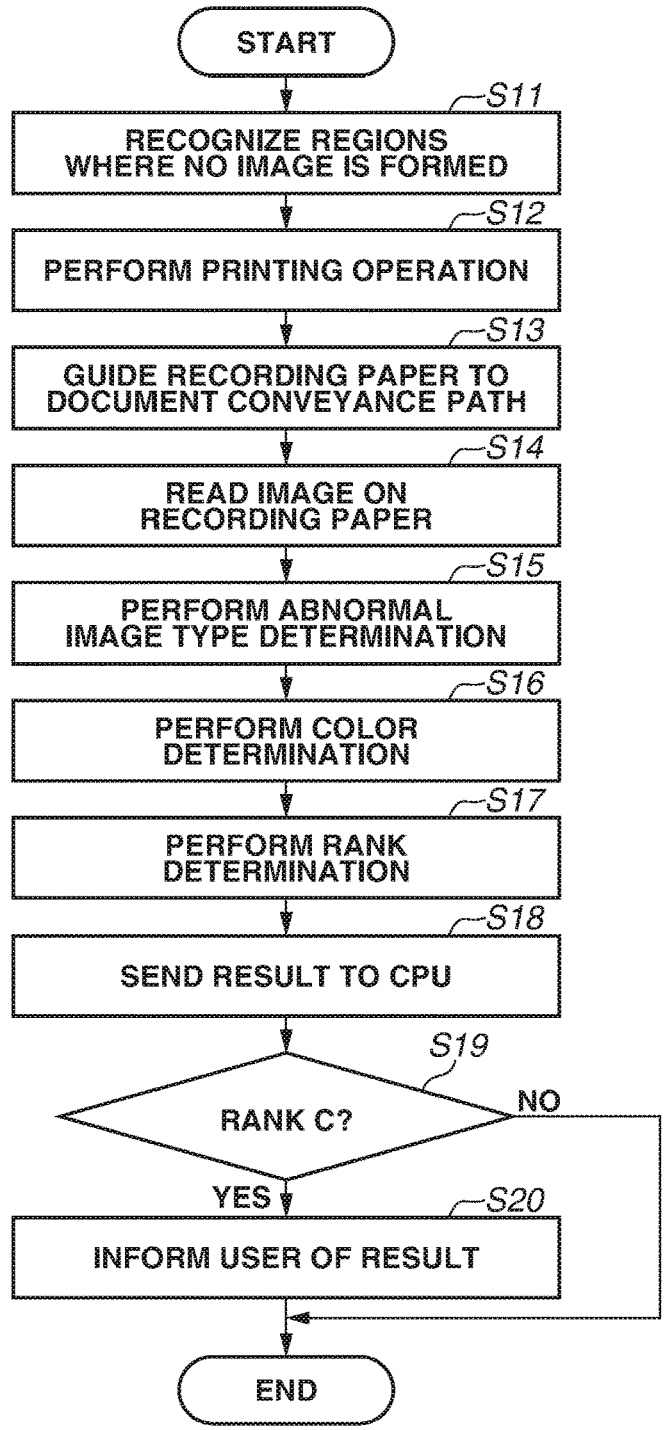
FIG. 11 is a flowchart illustrating an image defect reading process according to the fourth exemplary embodiment.

The fourth exemplary embodiment performs the abnormal image reading process according to the flowchart illustrated in FIG. 11. In the present exemplary embodiment, the CPU 3 starts an image defect detection sequence at predetermined timing, for example, each time printing on 100 sheets is completed. In step S11, based on the image data stored in the memory 4, the CPU 3 recognizes regions E where no image is formed, as illustrated in FIG. 4A. In this case, the image used for diagnosis may be, for example, an arbitrary image with respect to which the user has instructed the CPU 3 to perform printing in another case. A dedicated test chart does not need to be used. In step S12, the CPU 3 performs a printing operation through the image forming unit 300 based on the image data stored in the memory 4. In step S13, the flapper 301 switches its position to guide the recording material P to the document conveyance path 304. In step S14, the reading unit 306a (306b) reads the image on the recording material P guided to the document conveyance path 304. In step S15, the CPU determines the type of image abnormality by using a similar method to the first exemplary embodiment. In step S16, the CPU 3 performs color determination by using a similar method to the second exemplary embodiment. In step S17, the user performs rank determination on the abnormal image by using a method similar to the third exemplary embodiment. In step S18, the user sends the determination result to the CPU 3, and the CPU 3 stores the determination result in a memory (not illustrated). In step S19, the CPU 3 determines whether rank C has occurred. When rank C has occurred as a result of the determination (YES in step S19), the processing proceeds to step S20. On the other hand, when rank A or B has occurred (NO in step S19), the processing exits this sequence. When rank C has occurred, in step S20, the CPU 3 prompts the user to replace the process cartridge of the color with respect to which the abnormal image of rank C has occurred.

Figure 12:
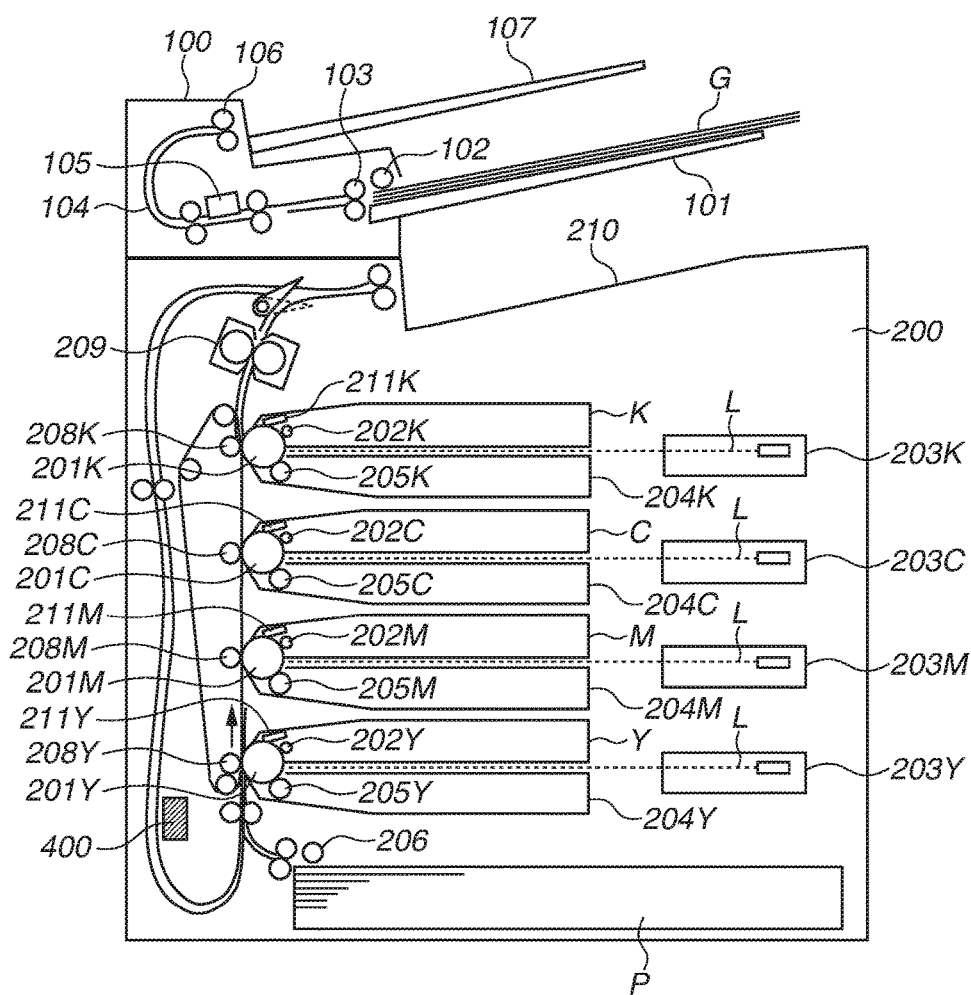
FIG. 12 schematically illustrates a configuration of a copying machine according to a fifth exemplary embodiment.

As a method for achieving a configuration in which the conveyance path for the recording material P is also used as a conveyance path for the document G other than the present exemplary embodiment, the image reading unit 400 may be disposed on the two-sided conveyance path in the image forming apparatus, as illustrated in FIG. 12.

A fifth exemplary embodiment will be described below. The configuration of the fourth exemplary embodiment enables determining an abnormal image without bothering the user. Since dealing with an abnormal image can be automatically and periodically performed, the frequency of abnormal image inspection increases. In the fifth exemplary embodiment, the control up to step S17 is similar to the fourth exemplary embodiment. The fifth exemplary embodiment relates to subsequent steps in which control is performed to improve image abnormality.

Figure 13:
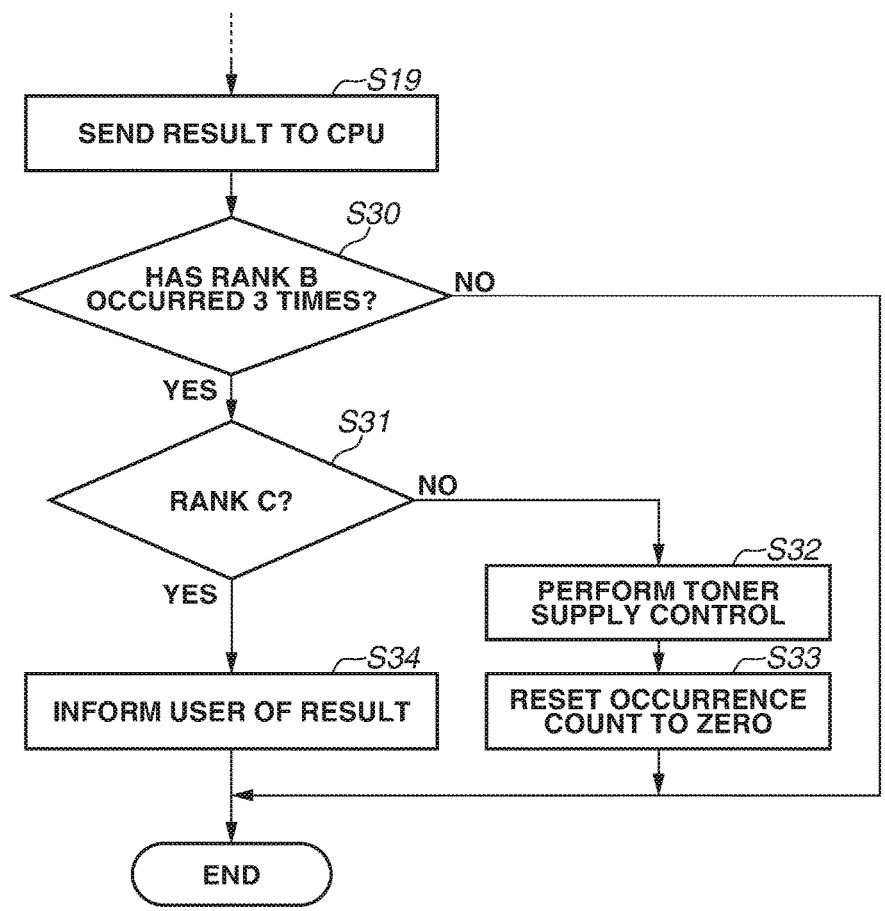
FIG. 13 is a flowchart illustrating an image defect reading process according to the fifth exemplary embodiment.

Processing according to the present exemplary embodiment will be described below with reference to the flowchart illustrated in FIG. 13. However, since the control up to step S17 is similar to the fourth exemplary embodiment, redundant descriptions thereof will be omitted. In step S19, the user sends the determination result to the CPU 3, and the CPU 3 stores the determination result in a memory (not illustrated). In step S30, the CPU 3 determines whether faulty cleaning of rank B has occurred three times. When rank B has occurred three times (YES in step S30), the processing proceeds to step S31. On the other hand, when rank B has not occurred three times (NO in step S30), the processing exits this sequence. In step S31, the CPU 3 determines whether the faulty cleaning of rank C has occurred. When rank C has occurred (YES in step S31), the processing proceeds to step S34. In step S34, the CPU 3 prompts the user to replace the process cartridge of the color with respect to which an image defect of rank C has occurred. On the other hand, when rank C has not occurred (NO in step S31), the processing proceeds to step S32. In step S32, the CPU 3 performs control to supply toner to the tip of the cleaning blade 211. With the color of the process cartridge in which faulty cleaning has occurred, the CPU 3 prints a 210×10 mm solid image (210 mm long covering the entire printing area in the longitudinal direction of the photosensitive drum 201 in a case of the image forming apparatus according to the present exemplary embodiment, and 10 mm long in the paper conveyance direction). Unlike the normal printing operation, as a primary transfer voltage, the CPU 3 applies a voltage having the same polarity as the toner's polarity at the transfer portion of the image forming unit. Therefore, the toner image is not transferred to the electrostatic transfer belt 221 but remains on the photosensitive drum 201 as it is.

The toner image remaining on the photosensitive drum 201 is conveyed to the cleaning blade 211 and collected. When toner is discharged, toner is supplied to the tip of the cleaning blade 211, and the contact state of the cleaning blade 211 becomes stable. In step S33, the CPU resets the faulty cleaning occurrence count to zero.

By performing this control, timing of the occurrence of faulty cleaning of rank C can be delayed. In other words, the life of process cartridge members can be prolonged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-028793, filed Feb. 18, 2016, which is hereby incorporated by reference herein in its entirety.

What is claimed is:

1. An image forming apparatus comprising:
   an input unit configured to input image data;
   an image forming unit configured to form an image on a recording material based on the image data input by the input unit;
   a reading unit configured to read the image formed on the recording material by the image forming unit; and
   a control unit configured to, based on the input image data and the image read by the reading unit, acquire a plurality of change amounts from the read image,
   wherein the plurality of change amounts includes a change amount of an image in a conveyance direction of a recording material and a change amount of an image in a direction perpendicular to the conveyance direction, and
   wherein the control unit determines a type of an abnormal image based on the plurality of acquired change amounts.

2. The image forming apparatus according to claim 1, wherein the reading unit reads a region in the image data where no image is formed on a recording material.

3. The image forming apparatus according to claim 1, wherein the reading unit reads a region in the image data where an image has a uniform density.

4. The image forming apparatus according to claim 1, wherein the type of the abnormal image includes a black-dot image, an image with an uneven density in a recording material conveyance direction, and an image of an uneven density in a direction perpendicular to the conveyance direction.

5. The image forming apparatus according to claim 4, wherein the image forming unit includes an image bearing member and a charging unit for charging the image bearing member, and
   wherein, when it is determined that the abnormal image is the black-dot image, or the image of an uneven density in the direction perpendicular to the conveyance direction, the control unit determines that an abnormality has occurred in the charging unit.

6. The image forming apparatus according to claim 4, wherein the image forming unit includes an image bearing member and a cleaning unit for cleaning the image bearing member, and
   wherein, when it is determined that the abnormal image is the image of an uneven density in the conveyance direction, the control unit determines that an abnormality has occurred in the cleaning unit.

7. The image forming apparatus according to claim 1, wherein the image forming unit includes a plurality of image forming units for forming a multi-color image, and
   wherein the control unit determines a color of the image read by the reading unit, and, based on the determined color, determines an image forming unit in which an abnormality has occurred, of a plurality of the image forming units.

8. The image forming apparatus according to claim 1, wherein the image forming apparatus includes a two-sided conveyance path where a recording material is conveyed to form an image on both surfaces of the recording material, and
   wherein the reading unit is disposed in the two-sided conveyance path.

9. The image forming apparatus according to claim 1, wherein the reading unit is disposed at an upper portion of the image forming unit, and
   wherein the reading unit includes a conveyance path switching portion for conveying the recording material to the reading unit with an image formed thereon by the image forming unit.

10. An image forming apparatus comprising:
    an input unit configured to input image data;
    an image forming unit configured to form an image on a recording material based on the image data input by the input unit;
    a reading unit configured to read the image formed on the recording material by the image forming unit; and
    a control unit configured to, based on the input image data and the image read by the reading unit, acquire feature quantities in a partial range of the read image,
    wherein the acquired feature quantities are feature quantities corresponding to a plurality of parameters of an image, and
    wherein the control unit determines a rank of an abnormal image based on the acquired feature quantities.

11. The image forming apparatus according to claim 10, wherein the acquired data is data calculated by using a predetermined algorithm, and the rank of the abnormal image is determined as a rank determined corresponding to a smallest value of the data.

12. The image forming apparatus according to claim 11, wherein the predetermined algorithm is a Mahalanobis-Taguchi method.

13. The image forming apparatus according to claim 10, wherein, when a predetermined rank appears as a result of the rank determination, the control unit performs control to improve the abnormal image.

14. The image forming apparatus according to claim 10, wherein the image forming unit includes a photosensitive drum and a cleaning member, and
    wherein the control to improve the abnormal image is control to supply toner to a portion where the cleaning member and the photosensitive drum contact each other.

15. The image forming apparatus according to claim 10, wherein the reading unit is disposed at an upper portion of the image forming unit, and
    wherein the image forming apparatus comprises a conveyance path switching portion for conveying a recording material with an image formed thereon by the image forming unit, to the reading unit.

16. The image forming apparatus according to claim 10, wherein the plurality of parameters of an image includes a density of an image, a width of a line image, and the number of line images.

* * * * *